Figure 1:
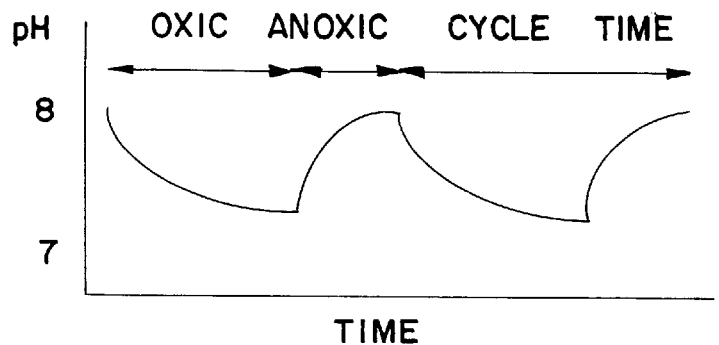

United States Patent
Heijnen et al.

[11] Patent Number: 5,863,435
[45] Date of Patent: Jan. 26, 1999

[54] BIOLOGICAL TREATMENT OF WASTEWATER

[75] Inventors: Joseph Johannes Heijnen, Rijen; Marinus Cornelis Maria van Loosdrecht, De Lier, both of Netherlands

[73] Assignee: Grontmij Advies & Techniek B.V., Bilt, Netherlands

[21] Appl. No.: 915,870

[22] Filed: Aug. 21, 1997

[30] Foreign Application Priority Data

Aug. 23, 1996 [NL] Netherlands ............................ 1003866

[51] Int. Cl.$^6$ ...................................................... C02F 3/30
[52] U.S. Cl. ......................... 210/605; 210/610; 210/614; 210/630; 210/903
[58] Field of Search .................................... 210/605, 610, 210/614, 620, 630, 631, 903

[56] References Cited

U.S. PATENT DOCUMENTS

| 4,655,925 | 4/1987 | Tabata et al. | 210/605 |
| 5,076,928 | 12/1991 | Ballnus | 210/614 |
| 5,266,200 | 11/1993 | Reid | 210/614 |
| 5,624,565 | 4/1997 | Lefevre et al. | 210/614 |
| 5,626,754 | 5/1997 | Ballnus | 210/605 |

FOREIGN PATENT DOCUMENTS 292438 3/1990 Germany .

OTHER PUBLICATIONS

Delft Integraal, "Single–Reactor Nitrogen Removal Process: Simple & Effective", part 12, No. 1, 1995, Tu Delft–NL, pp. 3–7.

*Primary Examiner*—Christopher Upton
*Attorney, Agent, or Firm*—Jones, Day, Reavis & Pogue

[57] ABSTRACT

A method is described for the biological treatment of ammonium-rich wastewater in at least one reactor which has a temperature of at least 25° C., which involves the wastewater being passed through the said reactor(s) with a population, obtained by natural selection in the absence of sludge retention, in the suspended state of nitrifying and denitrifying bacteria to form, in a first stage with the infeed of oxygen, a nitrite-rich wastewater and by the nitrite-rich wastewater thus obtained being subjected, if required, in a second stage without the infeed of oxygen, to denitrification in the presence of a carbon source such as methanol, in such a way that the contact time between the ammonium-rich wastewater and the nitrifying bacteria is at most about two days, and the pH of the medium is controlled between 6.5 and 8.5 by the infeed of the said carbon source, and the excess, formed by growth, of nitrifying and denitrifying bacteria and the effluent formed by the denitrification are extracted, the demand for the said carbon source during the treatment being controlled as a function of the amount of heat produced in the reactor. In addition the growth rate of the nitrifying and denitrifying bacteria is expediently controlled by means of the retention time, in the reactor, of the wastewater to be treated which is fed in.

9 Claims, 1 Drawing Sheet

BIOLOGICAL TREATMENT OF WASTEWATER

BACKGROUND OF THE INVENTION

The invention relates to a method for the biological treatment of ammonium-rich wastewater in at least one reactor which has a temperature of at least 25° C., by the wastewater being passed through the said reactor(s) with a population, obtained by natural selection in the absence of sludge retention, in the suspended state of nitrifying and denitrifying bacteria to form, in a first stage with the infeed of oxygen, a nitrite-rich wastewater and by the nitrite-rich wastewater thus obtained being subjected, if required, in a second stage without the infeed of oxygen, to denitrification in the presence of a carbon source such as methanol, in such a way that the retention time of the ammonium-rich wastewater is at most about three days, and the pH of the medium is controlled between 6.5 and 8.5 by the infeed of the said carbon source, and the excess, formed by growth, of nitrifying and denitrifying bacteria and the effluent formed by the denitrification are extracted.

Such a method is known from a publication in Delft Outlook, 95.2, pp. 14–17. However, the research reported in this publication was carried out on a laboratory scale and does not provide any suggestion whatsoever on the measures required for using such a process in practice to achieve adequate cleaning of the wastewater in question.

As a result of discharge standards having become more stringent, in particular for nitrogen, there is a need for efficient, cost-effective purification systems for the treatment of wastewater. Examples of these concentrated industrial wastewater streams are, wastewater streams like those released with off-gas treatment etc. Another example of the concentrated nitrogen-rich wastewater stream is the so-called rejection water. This rejection water stream is formed after dewatering of fully digested sewage sludge and has not only a high ammonium concentration (about 1000 mg of $NH_4$-N per litre) but also a high temperature (usually about 30° C.). The ammonium in the rejection water may account for as much as 15% of the total nitrogen loading of a wastewater treatment installation, while the volume flow of the rejection water is only less than 1% of the wastewater volume flow to be processed. This rejection water therefore makes a considerable contribution to the nitrogen loading of the treatment installation.

The biological treatment of such wastewater streams normally makes use of treatment processes in which the high sludge concentrations required are obtained by employing a form of sludge retention such as settling, membrane filtration, attachment to filter media, etc. In that context it is worth drawing attention to the STOWA report 95–08, which relates to the treatment of nitrogen-rich return streams in sewage plants, and to the Proc. 18th IAWQ Biennial, Water Quality International '96, 23–28 June 1996, Singapore, pp. 321–328.

An, as it happens, frequently used treatment process is known as the activated-sludge system. Such a system is characterized on the one hand by employing sludge retention by sludge settling and, on the other hand, by the bacteria mainly being present in so-called activated-sludge flocculae. Such flocculae usually have a size of 0.1–2 mm.

SUMMARY OF THE INVENTION

It should be noted that the present process of biological nitrogen removal preferably proceeds in two successive stages, an aerobic and an anoxic stage. Both stages can, in the present invention, take place in one reactor, separated in time, or in separate reactors which may or may not involve a return stream to the first stage. In the first stage the nitrogen present as ammonium is largely converted into nitrite, with the aid of oxygen and nitrifying bacteria. The second stage comprises the conversion of nitrite into molecular nitrogen, said conversion being anoxic and taking place with the aid of denitrifying bacteria. These denitrifying bacteria require a carbon source such as methanol, to carry out the said conversion.

We have now found, surprisingly, that the method as set forth in the preamble can be carried out on an industrial scale, with an ammonium removal efficiency of more than 90% being achieved, by controlling the demand of the denitrifying bacteria for a carbon source, in this case methanol.

More in particular we have found that the methanol demand during the treatment can be controlled as a function of the amount of heat produced in the reactor. These parameters proved to be directly proportional to one another. As will be explained hereinafter, the pH of the medium is controlled at the same time by means of the methanol being metered.

It should be noted that during the nitrification two moles of protons are produced per oxidized mole of ammonium. The pH drops as a result. The pH is usually controlled by feeding alkali and/or acid into the reactor. During denitrification, on the other hand, protons are consumed. Denitrification furthermore takes place under anoxic conditions, nitrite being used as an electron acceptor. For denitrification to be possible, the presence of not only an electron acceptor, but also of an electron donor is required. Methanol, for example, is indeed added at the same time in the present process as an electron donor.

In addition, the following may be noted with respect to the present process. For the purpose of nitrogen removal, the ammonium present in the wastewater is not nitrified to nitrate but only to nitrite. Indeed, the term of nitritifying bacteria is sometimes used, to indicate more clearly that what takes place predominantly is the formation of nitrite. The denitrifying bacteria which are capable of anoxic conversion of both the nitrate and the nitrite into molecular nitrogen, consume a carbon source such as methanol, as explained above. The conversion of nitrite into molecular nitrogen requires on its own, however, about 40% less methanol than the conversion of nitrate into nitrogen. Moreover, the oxidation of nitrite to nitrate costs oxygen. Indeed, direct conversion of nitrite into nitrogen provides another (approximately) 25% savings on the oxygen account. The conversion via nitrite instead of nitrate is therefore very advantageous in economic terms.

If, under certain circumstances, the conversion via nitrate is more attractive, however, than the conversion via nitrite, this can obviously be achieved by extending the retention time, of the wastewater to be treated, in the present process.

In an expedient variation of the present process in addition the growth rate of the nitrifying and denitrifying bacteria is controlled by means of the retention time, in the reactor, of the wastewater to be treated which is fed in. This retention time is an important parameter, since the stability of the nitrifying process may be put at risk as a result of the maximum growth rate of the biomass decreasing as the temperature decreases. This therefore requires a higher temperature than with known, more conventional processes. In practical trials the influent of the reactor was found to have a temperature of 30° C. The biological conversion such as the nitrification will cause the temperature to rise by about 15° C. per gram of nitrogen per litre removed. Increasing the process control temperature beyond 40° C., however, is not advantageous to the stability of the present process. By controlling the amount to be fed in of wastewater to be treated it is therefore possible to control the growth rate of the biomass; the temperature in the system and consequently the heat production therein then reflects the conversion in the system.

It was found that a retention time of the amount of wastewater to be fed in of 0.5–2.5 days, preferably of 1.3–2.0 days, affords optimum results, i.e. an overall removal efficiency of more than 90%.

Expediently, the retention time in the aerobic phase is from 0.5 to 2 days and in the anoxic phase from 0.4 to 1 day. A reduction in the retention time in the aerobic phase may lead to an improvement in the ammonium conversion ratio. This is caused by a longer retention time for the denitrifying bacteria then being achieved with an identical cycle time of the aerobic and anoxic period. This produces a higher average pH, as a result of which the ammonium conversion rate is increased. If the retention time in the aerobic phase is extended at the expense of the retention time in the anoxic phase, the pH is not sufficiently stabilized by the denitrifying bacteria and the conversion ratio drops again. However, if the retention time in the aerobic phase is reduced too far, the nitrifying bacteria will be flushed out and as a result the conversion ratio again drops.

Although control of the pH of the process according to the invention is effected by methanol being metered as a function of the amount of heat produced by the biological treatment, monitoring of the pH is obviously possible by the pH of the medium being measured directly. As explained above, protons (or acid ions) are produced during the nitrification process, as a result of which the pH of the medium drops in accordance with the equation

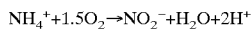

$$NH_4^+ + 1.5O_2 \rightarrow NO_2^- + H_2O + 2H^+$$

The nitrification rate is therefore pH-dependent, so that conversely the pH can be regarded as a relevant process parameter. It was found, incidentally, that during the nitrification buffering may take place by bicarbonate ($HCO_3^-$) which is present in the rejection water fed into the reactor or is added, in accordance with the equation

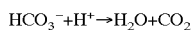

$$HCO_3^- + H^+ \rightarrow H_2O + CO_2$$

For an optimum effect it is important, in this context, that the carbon dioxide is transported (stripped) from the liquid phase to the gas phase. With respect to dimensioning the reactor to be used in the method according to the invention it was indeed found, in this context, that in the case of a ratio of volume to bottom area of the reactor in the range of 2–10 very beneficial results are achieved in terms of the nitrification-denitrification process according to the invention.

The characteristic feature of the invention is that the process takes place without sludge retention being employed, i.e. the sludge retention time is equal to the liquid retention time. To achieve this, both the mixing and the discharge of the treated water need to be effective. Good mixing can be obtained by employing, for example, aeration in the aerobic phase, and in the anoxic phase, for example, by employing mechanical agitators, liquid injection, introduction of low-oxygen or oxygen-free gases etc. As a result of these measures a very active bacterial population is obtained, which is mainly present in the liquid phase as free cells and/or very small clusters of a limited number of cells, rather than activated-sludge flocculae.

It should further be noted that the denitrification in the reactor is carried out under essentially oxygen-free conditions. Such conditions can be formed spontaneously as a result of denitrifying bacteria consuming the oxygen present, the environment consequently automatically becoming anoxic. Expediently, and to accelerate the process if required, the denitrification is carried out, however, with recycling of the nitrogen already formed previously by denitrification. An additional advantage of this is that the nitrogen stream through the reactor at the same time strips the carbon dioxide from the reactor.

As indicated above, the excess, formed by growth, of nitrifying and denitrifying bacteria is extracted. In practice this involves these bacteria being entrained by the effluent from the reactor and being added to the main stream of the wastewater treatment process, after which the further removal of residual ammonium is carried out.

It should be noted that the effluent from the reactor is preferably withdrawn therefrom at a point below the liquid level prevailing in the reactor, expediently with local intensive mixing. While at the moment this cannot be stated with certainty, this measure may be essential for a process without sludge retention.

According to an attractive variation of the method according to the invention, the nitrite-rich, acidic effluent formed by nitrification is used, at least in part, for the neutralization of ammonia. This ammonia can be present both in the rejection water to be treated and, alternatively, in a process stream of whatever origin. The treatment can be carried out, for example, in a gas scrubbing installation known per se, whereas the effluent obtained after treatment can be recycled, for further treatment, to the nitrification reactor according to the invention.

SURVEY OF THE DRAWINGS

Figure 2:
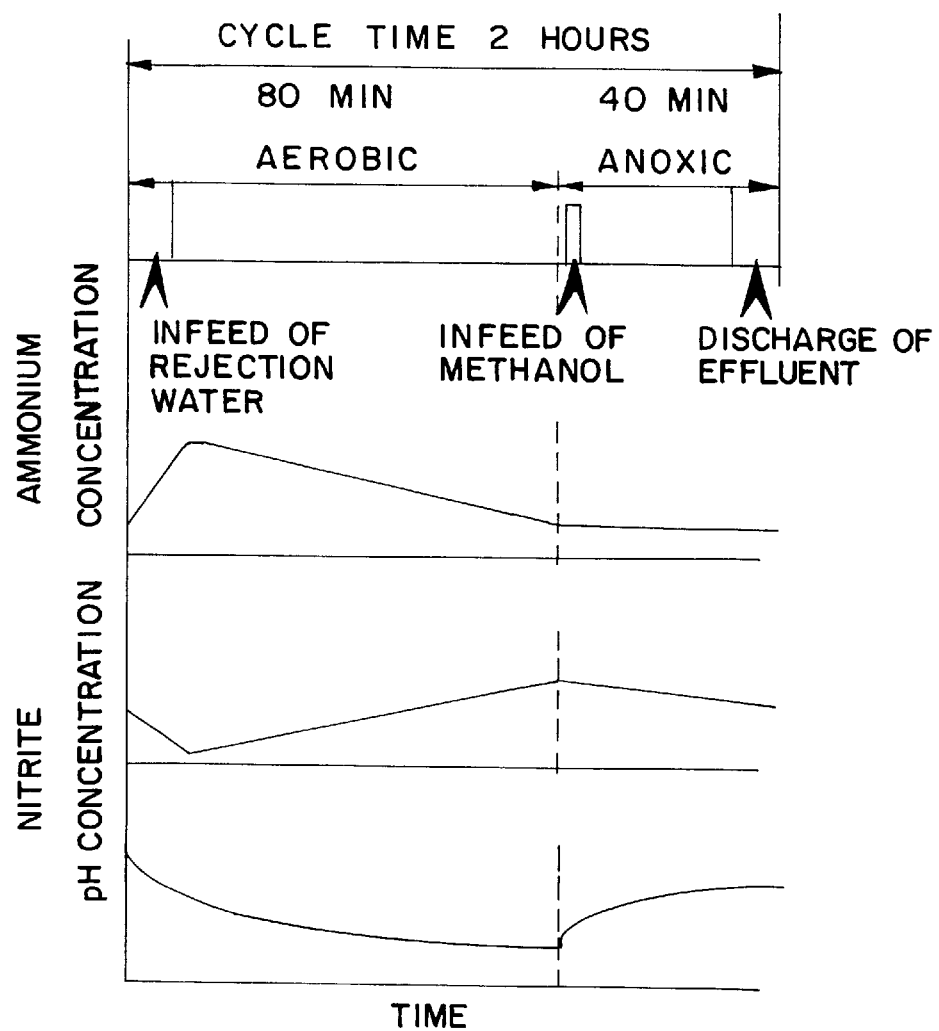

The accompanying FIGS. 1 and 2 schematically show the progress of the nitrification/denitrification process according to the invention. More in particular, FIG. 1 provides a sketch of the pH profile in the reactor, the pH being controlled between 8 and 7 with the addition of methanol.

FIG. 2 also represents the change in time, produced by methanol being fed in, of the nitrite concentration and ammonium concentration for one cycle.

It should be noted that if it is undesirable or less desirable for the bacteria present in the effluent to reach the main stream of the wastewater treatment process when the effluent is recycled to said main stream, said effluent, according to a very expedient embodiment of the method according to the invention, is first subjected to a treatment with protozoa. Such a variation is of interest, in particular, if the influent of the reactor is a COD-containing wastewater. The term COD refers, as usual, to chemical oxygen demand; the component relevant thereto in solution is primarily formed by carbon bound in organic compounds. This material acts as a nutrient for the bacteria present in the reactor. By subjecting the effluent of the biological treatment to a treatment with protozoa it proved possible to largely remove the bacteria suspended in the effluent and entrained from the reactor.

It should also be noted that the principle, employed in the method according to the invention, of the absence of sludge retention can also expediently be employed in the treatment of COD-containing wastewater. More in particular this then means replacing the present nitrite route by the COD route, in which case an overall removal efficiency of more than 50% was obtained.

The invention is explained in more detail with reference to an exemplary embodiment.

EXAMPLE

In this example a continuous flow reactor without sludge retention was employed. Such a reactor makes it possible for the bacterial population having the lowest maximum growth rate to be flushed from the system selectively.

The reason for this is that a retention time can be used which is lower than the maximum reciprocal growth rate of the one bacterial population (in this case the nitrite oxidizers which oxidize the nitrite present to nitrate), but is higher than the maximum reciprocal growth rate of the other bacterial population (in this case the ammonium oxidizers). Flushing out the nitrite oxidizers therefore leads to a build-up of nitrite in the reactor.

The reactor used had a diameter of about 20 m and a height of 6 m and therefore an effective volume of about 1150 m$^3$.

The influent for the reactor, the so-called rejection water, had a temperature of about 30° C. and an ammonia concentration of about 1000 mg of N/l, while the total amount of rejection water fed in was about 760 m$^3$ per day.

For the purpose of converting ammonia into nitrite, followed by the conversion into nitrogen, the reactor contained about 120 kg of biomass.

The treatment of the rejection water took place in the reactor with a cycle configuration as shown in FIG. 2, i.e. a cycle time of about 2 hours consisting of an aeration period of ±80 min, followed by a period involving recycling of the nitrogen gas formed in a first period of bout 40 min.

In the steady state of the process the amount of rejection water fed to the reactor was such that the retention time was about 1.5 days. The infeed of methanol was about 1 kg per kg of nitrogen bound as ammonium and was effected in such a way, while the temperature difference between the input and the output of the reactor was being measured, that the pH of the medium could be kept between about 7.2 and 7.7.

The rejection water thus treated had a nitrogen concentration of as little as about 80 mg of total N·l$^{-1}$, which could be recycled for treatment to the main stream of the treatment installation. The result of the treatment of this rejection water was therefore a purification efficiency of about 90%.

We claim:

1. A method for the biological treatment of ammonium-rich wastewater in at least one reactor which has a temperature of at least 25° C., by the wastewater being passed through the said reactor(s) with a population, obtained by natural selection in the absence of sludge retention, in the suspended state of nitrifying and denitrifying bacteria to form, in a first stage with the infeed of oxygen, a nitrite-rich wastewater and by the nitrite-rich wastewater thus obtained being subjected, in a second stage without the infeed of oxygen, to denitrification in the presence of a carbon source such as methanol, in such a way that the contact time between the ammonium-rich wastewater and the nitrifying bacteria is at most about two days, and the pH of the medium is controlled between 6.5 and 8.5 by the infeed of the said carbon source, and the excess, formed by growth, of nitrifying and denitrifying bacteria and the effluent formed by the denitrification are extracted, the demand for the said carbon source during the treatment being controlled as a function of the amount of heat produced in the reactor.

2. A method according to claim 1, wherein in addition the growth rate of the nitrifying and denitrifying bacteria is controlled by means of the retention time, in the reactor, of the wastewater to be treated which is fed in.

3. A method according to claim 2, wherein a retention time of 0.5–2.5 days is used.

4. A method according to claim 2, wherein the retention time of the wastewater to be treated is extended, under nitrifying conditions, to form nitrate.

5. A method according to claim 1, wherein the denitrification in the reactor is carried out under essentially oxygen-free conditions.

6. A method according to claim 1, wherein the denitrification is carried out with recycling of the nitrogen already formed previously by denitrification.

7. A method according to claim 1, wherein the effluent is withdrawn from the reactor at a point below the liquid level prevailing in the reactor.

8. A method according to claim 1, wherein the effluent of the biological treatment is subjected to a treatment with protozoa.

9. A method according to claim 1, wherein the nitrite-rich, acidic effluent formed by nitrification is used, at least in part, for the neutralization of ammonia.

* * * * *